United States Patent
Chudge et al.

(10) Patent No.: US 10,255,038 B2
(45) Date of Patent: Apr. 9, 2019

(54) TECHNIQUES TO PRESENT A USER INTERFACE FOR THE VISUALLY IMPAIRED

(71) Applicant: MICROSOFT TECHNOLOGY LICENSING, LLC, Redmond, WA (US)

(72) Inventors: Jarnail Chudge, Reading (GB); Tinisha Rocca, Highwycombe (GB); Joanna Mabbitt, Reading (GB); Helen Day, Stokeonprent (GB); Simon Middlemiss, Newbury (GB); Stuart McCarthy, Reading (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 784 days.

(21) Appl. No.: 13/871,563

(22) Filed: Apr. 26, 2013

(65) Prior Publication Data
US 2014/0325353 A1 Oct. 30, 2014

(51) Int. Cl.
*G06F 3/16* (2006.01)
*G06F 3/0481* (2013.01)
*G06F 3/0482* (2013.01)
*G09B 21/00* (2006.01)

(52) U.S. Cl.
CPC ............ *G06F 3/167* (2013.01); *G06F 3/0481* (2013.01); *G06F 3/0482* (2013.01); *G06F 2203/04803* (2013.01); *G09B 21/006* (2013.01)

(58) Field of Classification Search
CPC ................................ G06F 3/167; G06F 3/017
See application file for complete search history.

(56) References Cited

U.S. PATENT DOCUMENTS

| 6,046,722 | A | 4/2000 | McKiel, Jr. |
| 7,301,527 | B2 | 11/2007 | Marvit |
| 8,037,414 | B2 * | 10/2011 | Michaelis et al. ............ 715/729 |
| 8,381,107 | B2 | 2/2013 | Rottler et al. |
| 2006/0010059 | A1 * | 1/2006 | Park ............................. 705/35 |
| 2007/0219805 | A1 * | 9/2007 | Nomura ........................ 704/275 |
| 2008/0072154 | A1 * | 3/2008 | Michaelis ........... G06F 3/04812 715/727 |
| 2009/0281839 | A1 * | 11/2009 | Lynn et al. ........................ 705/3 |

(Continued)

OTHER PUBLICATIONS

Kane, et al., "Fully Accessible Touch Screens for the Blind and Visually Impaired", Retrieved at <<https://faculty.washington.edu/wobbrock/pubs/nish-09.pdf>>, Retrieved Date: Mar. 13, 2013, pp. 8.

(Continued)

*Primary Examiner* — Mandrita Brahmachari
(74) *Attorney, Agent, or Firm* — NovoTechIP International PLLC

(57) ABSTRACT

Techniques to provide a user interface usable by anyone including the visually impaired are disclosed. Embodiments include dividing a display area of an electronic device into a workspace comprising a plurality of sections; associating each section with a different category; displaying a pane in a section including information for the associated category; receiving a touch gesture on a pane for a section; and outputting an audio signal comprising information of the pane. Other embodiments are described and claimed.

20 Claims, 14 Drawing Sheets

(56) References Cited

U.S. PATENT DOCUMENTS

| | | | |
|---|---|---|---|
| 2010/0036667 A1* | 2/2010 | Byford | G06F 19/327 |
| | | | 704/270 |
| 2012/0005578 A1 | 1/2012 | Hawkins | |
| 2012/0208593 A1* | 8/2012 | Yang | G06F 3/0481 |
| | | | 455/556.1 |
| 2012/0299858 A1* | 11/2012 | Conkie | G06F 3/0482 |
| | | | 345/173 |
| 2013/0234963 A1* | 9/2013 | Yu et al. | 345/173 |
| 2014/0215329 A1* | 7/2014 | Zilberman et al. | 715/702 |

OTHER PUBLICATIONS

Lee, et al., "Beyond Mouse and Keyboard: Expanding Design Considerations for Information Visualization Interactions", Retrieved at <<http://research.microsoft.com/en-us/um/people/nath/docs/naturalinfovis_infovis2012.pdf>>, In Journal of IEEE Transactions on Visualization and Computer Graphics, vol. 18, No. 12, Dec. 2012, pp. 10.

Kane, et al., "Usable Gestures for Blind People: Understanding Preference and Performance", Retrieved at <<http://dub.washington.edu/djangosite/media/papers/chi11-gestures.pdf>>, In Proceedings of the SIGCHI Conference on Human Factors in Computing Systems, May 7, 2011, pp. 10.

"After Effects /Workspaces, Panels, and Viewers", Retrieved at <<http://help.adobe.com/en_US/aftereffects/cs/using/WS5421A290-E54C-489f-806F-BCB0C0879136a.html>>, Retrieved Date: Mar. 13, 2013, pp. 6.

\* cited by examiner

1000

- DIVIDE A DISPLAY AREA INTO A PLURALITY OF SECTIONS
  *1002*

- ASSOCIATE EACH SECTION WITH A CATEGORY
  *1004*

- DISPLAY A PANE IN EACH SECTION HAVING INFORMATION ABOUT THE CATEGORY
  *1006*

- DISPLAY A LIST HAVING A PLURALITY OF LIST ITEMS

1202

- SELECT A NUMBER OF EQUALLY SPACED FREQUENCIES FROM A SCALE, INCLUDING THE HIGHEST AND LOWEST FREQUENCIES IN THE SCALE, ACCORDING TO THE NUMBER OF LIST ITEMS

1204

- ASSIGN EACH SELECTED FREQUENCY TO A LIST ITEM SEQUENTIALLY

1206

- OUTPUT THE FREQUENCY OF A LIST ITEM WHEN A TOUCH GESTURE IS RECEIVED ON THAT LIST ITEM

TECHNIQUES TO PRESENT A USER INTERFACE FOR THE VISUALLY IMPAIRED

BACKGROUND

Various methods and devices exist for assisting those with visual impairments in using computers, tablets, smart phones and other such devices. These methods and devices include hardware and software solutions that, for example, read text aloud to a user, enlarge images and text, and so forth. Some of these methods and devices can be difficult to use, provide inconsistent or non-intuitive user experiences, or may not work well with all applications. It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to present a user interface usable by anyone, and providing features to assist the visually impaired. Some embodiments are particularly directed to techniques to present a user interface for the visually impaired that provide a consistent, intuitive user experience and that can interact with many applications and large complex sets of data. In one embodiment, for example, an apparatus may comprise a processing unit; and user interface logic comprising a workspace component operative on the processing unit to: divide a display area of the apparatus into a workspace comprising a plurality of sections; divide at least one section into a plurality of subsections; associate each section and subsection with a different category; display a pane in a section having information for the associated category; receive a touch gesture on a pane; and output an audio signal comprising information of the pane. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 10 illustrates a logic flow for the system of FIG. 1.

FIG. 12 illustrates a third logic flow for the system of FIG. 1.

DETAILED DESCRIPTION

Figure 1:
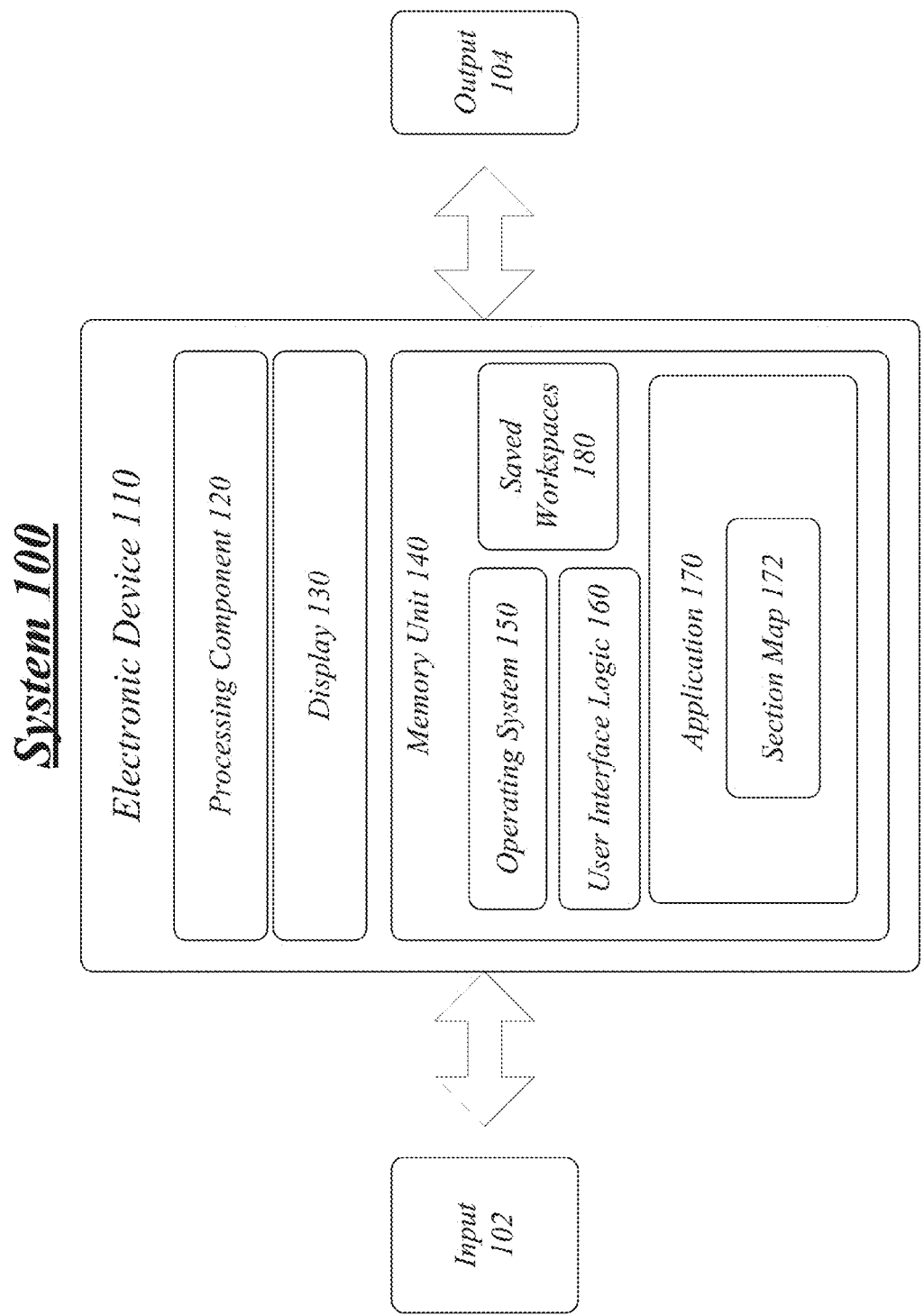
FIG. 1 illustrates an embodiment of a system to present a user interface.

Various embodiments are directed to techniques to present a user interface to the visually impaired that provides a consistent and intuitive user experience with computing technology, including mobile devices such as smart phones and tablet computers. Embodiments divide a display area into sections that are application independent. Each section may be associated with a different category, where the categories are application dependent. A pane may be displayed in each section showing information related to the category. As the user touches a pane, e.g. with a finger, a stylus, or a pointing device, the information related to the category of the pane may be read out to the user. Different types of touch gestures may change the type and/or amount of information that is output. The application independence of the sections may provide a consistent interface for the user. Dividing data into different categories on the display may also improve the ability of a visually impaired user to interact with more data at a time, and with more complex data at a time.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the described purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the described method steps. The needed structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a system 100. In one embodiment, the system 100 may comprise a computer-implemented system 100 having an electronic device 110 that includes one or more components, such as a processing component 120, a display 130, and a memory unit 140. Although the system 100 shown in FIG. 1 has a limited number of elements in a certain topology, it may be appreciated that the system 100 may include more or less elements in alternate topologies as desired for a given implementation.

The system 100 may comprise electronic device 110. Electronic device 110 may include any electronic device capable of receiving, processing, and sending information for the system 100. Examples of an electronic device may include, without limitation, an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

Electronic device 110 may execute processing operations or logic for the system 100 using a processing component 120. Processing component 120 may comprise various hardware elements. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth.

Electronic device 110 may include a display 130. Display 130 may be integrated into electronic device 110, or may be separate but communicatively coupled to electronic device 110. Display 130 may include a touch-sensitive surface that can detect a touch gesture, which may include contact with items such as a human fingertip, a stylus, an electronic pen, and so forth. Display 130 may, in particular, be able to detect at least one of a location, an amount of pressure, a speed of movement, and a direction of movement of a touch gesture. Display 130 may also include conventional computer monitors or integrated laptop computer screens that may or may not be touch-sensitive. In the case of a touch insensitive display, a touch gesture, as used herein, may refer to a control directive received, for example, via a computer mouse and its cursor as presented on display 130. Display 130 may also include non-visual output devices, such as speakers.

Electronic device 110 may include one or more memory units 140. A memory unit 140 may include various computer-readable storage devices, volatile and non-volatile, that store data and instructions for retrieval by processing component 120. As used herein, a memory unit 140 does not include signals or carrier waves, such as electromagnetic or optical waves. Memory units are described further with respect to FIG. 13.

Electronic device 110 may include instructions that are executable by processing component 120 to perform various operations. The instructions may include, without limitation, instructions for an operating system 150, user interface logic 160, and one or more software applications, such as application 170. Examples of instructions may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Operating system 150 may provide, generally, the instructions that allow the components of electronic device 110 to communicate with each other, generate graphical output for display 130, receive and process input 102, communicate with other devices, and so forth. Operating system 150 may include user interface logic 160 that presents a user interface that is application-independent.

User interface logic 160 may be a component of operating system 150, or may be a separate component that can be applied to an existing user interface provided by operating system 150. User interface logic 160 may be operative to present a consistent user interface across applications that may improve the user experience, in particular for visually impaired users. User interface logic 160 and its operations are described in greater detail with respect to the following figures.

Application 170 may include any application that provides some use to the user of electronic device 150. Examples of an application 170 include, without limitation, a search application, a word processor, a web browser, a presentation application, a media player, a game, a spreadsheet, a database, a medical records management application, and so forth.

Application 170 may include a section map 172. Section map 172 may be used by user interface logic 160 to determine where to display various data from application 170. User interface logic 160 may divide the display area of display 130 into sections. For a given application 170, each section may be associated with a category. For example, if application 170 is a medical records management application, one section may be associated with a patient's information and history, a second section may be associated with the category of treatments and medications; a third section may be associated with a category of context relevant data such as tests and assessments; and a fourth section may be associated with related information, such as information about current research on the patient's conditions, treatment support and so forth. Section map 172 may direct user interface logic 160 where to display the information related to each category, as will be described further.

Electronic device 110 may receive various input 102, for example, user-initiated control directives, data from other applications, data from other devices, and so forth. Application 170 may generate various output 104, for example, data, user interface elements, sounds, data, and so forth. Output 104 may include, in particular, text-to-speech audio output and tones of various frequencies to provide non-visual information to the user about the information displayed on the device.

User interface logic 160 may allow a user to save a configuration of data as a saved workspace 180 on memory unit 140. Saving a workspace may allow a user to preserve any changes made in a data set presented in a user interface generated by user interface logic 160, as will be described with respect to the following figures.

Figure 2:
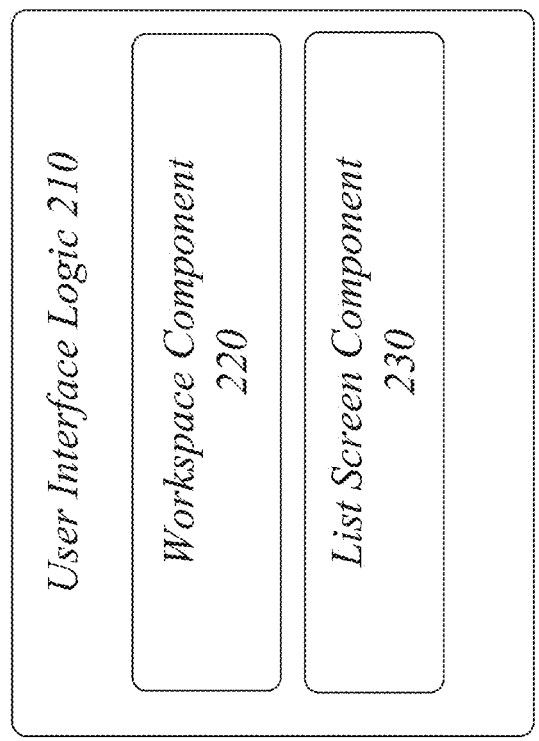
FIG. 2 illustrates an embodiment of user interface logic.

FIG. 2 illustrates an embodiment of user interface logic 210 for the system 100. User interface (UI) logic 210 may be a representative example of UI logic 160. UI logic 210 may include various functional components, for example, a workspace component 220 and a list screen component 230. More, fewer, or other functional components may be used to provide the operations of UI logic 210.

Workspace component 220 may provide the logic and functions that UI logic 210 uses to divide a display area into sections and to associate each section with a category for an application and/or for the operating system. Each category, for example, may use or display data from a different source. Workspace component 220 may display a pane in each section that includes information related to the category associated with that section. A workspace may serve as a top layer that presents categories of information that may be accessed in more detail in lower levels. In some embodiments, a workspace may exist only at the topmost level of information. In other embodiments, a workspace may be nested within another workspace and be presented when a lower level of information is accessed.

The information displayed may be output to the user, e.g. as a text-to-speech audio signal, or as audible tones correlated to non-textual information, in response to a touch gesture on a pane. In various embodiments, the amount of information that is output may be related to a time duration of the touch gesture. For example, a short tap gesture may read just a title or the first few words of the information. A touch and hold gesture may cause more information to be read out.

A pane may be selected to access more information related to the category. In some cases, selecting a pane may change the workspace display to a list of information, or may display a list within a pane. List screen component 230 may provide the logic and functions that UI logic 210 uses to provide a list of information with features that improve accessibility for the visually impaired. For example, list screen component 230 may associate a specific frequency with each list item such that when each list item is touched sequentially, a sequence of tones is output having increasing or decreasing frequency, depending on the direction of the sequence of touches. List screen component 230 may also cause the information in a list item to be read out in response to a touch gesture. In various embodiments, the amount of information that is output for a list item may be related to a time duration of the touch gesture. For example, a short tap gesture may read just a topic, a title or the first few words of the list item. A touch and hold gesture may cause more information to be read out.

Figure 3:
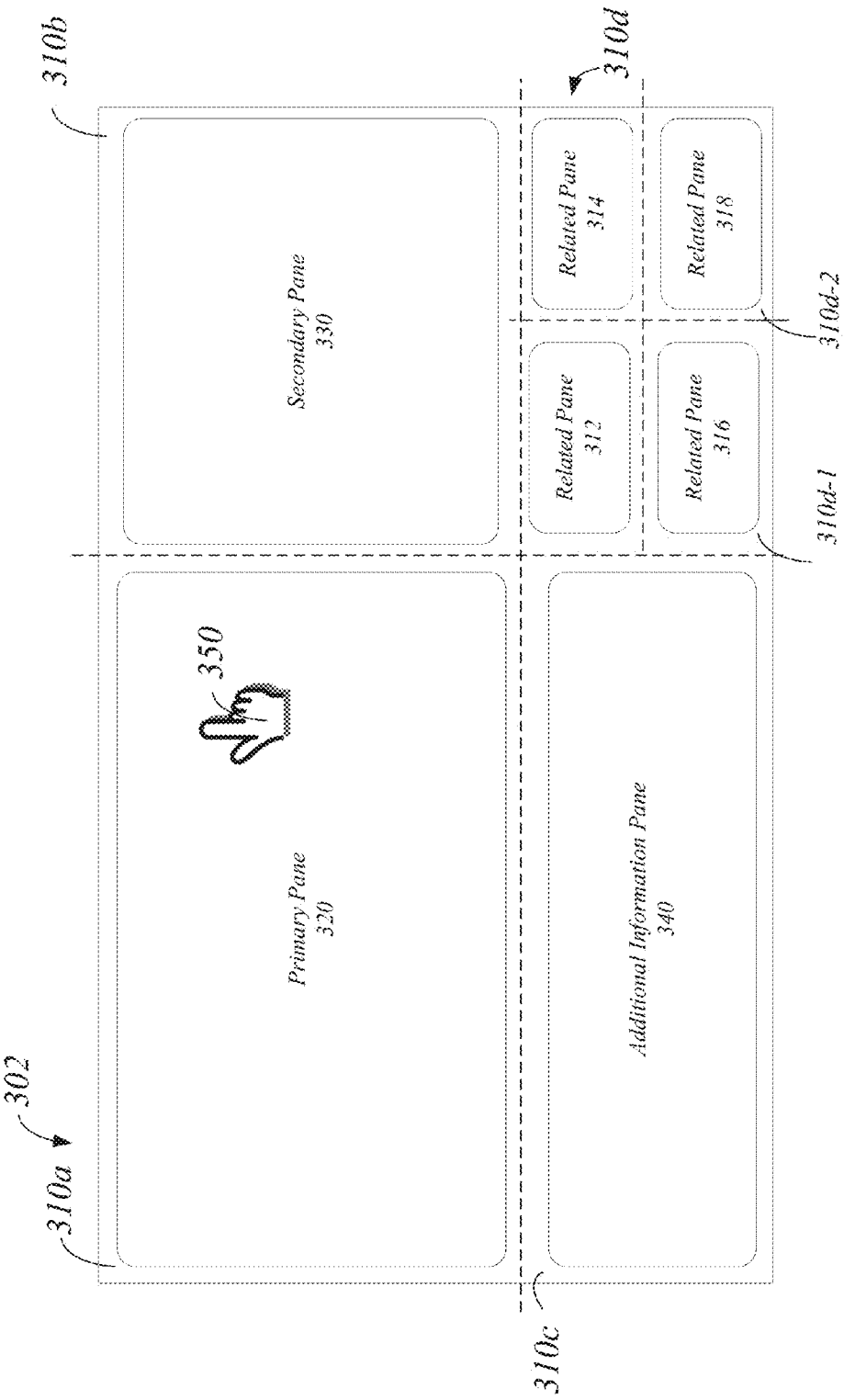
FIG. 3 illustrates an embodiment of a workspace.

FIG. 3 illustrates an embodiment of workspace 300 as may be provided by system 100. As shown in FIG. 3, workspace 300 is presented on a display 302, which may be a representative example of display 130. Display 302 may be divided into sections, e.g. sections 310a, 310b, 310c and 301d. While four sections are depicted in this and the following examples, fewer or more sections may be used. One or more sections may be divided into subsections. For example, section 310d is divided into four subsections, two of which are labeled 310d-1 and 310d-2. Fewer or more subsections may be used. The positions of the sections may remain fixed regardless of the active application. This may provide a consistent interface for the user. In various embodiments, the sections and subsections may be re-positioned by the user.

UI logic 160, 210 may display a pane in each section. For example, section 310a may display primary pane 320; section 310b may display secondary pane 330; and section 310c may display additional information pane 340. Section 310d may display a separate pane in each subsection. For example, subsection 310d-1 may display related pane 316; subsection 310d-2 may display related pane 318; and the other two subsections of section 310d may display, respectively, related pane 312 and related pane 314.

The designations of "primary," "secondary," "additional information," and "related" with respect to the panes may indicate a general, application-independent categorization of the information that may be displayed. Each specific application 170 may map application-specific information to each section using section map 172, as will be explained further in the context of a specific example.

A user may interact with workspace 300 using touch gestures, represented by icon 350. A touch gesture may include physical contact between a human finger and the surface of display 302. A touch gesture may include physical contact between a stylus, electronic pen, or other instrument and display 302. A touch gesture may include, for touch insensitive displays, a control directive received via an input device such as a computer mouse, keyboard, trackpad or the like, when a cursor associated with the input device is positioned over a pane in workspace 300.

One type of touch gesture may include a tap, where the duration of the touch gesture is relatively short and generally at one point. In response to receiving a tap touch gesture, information about the touched pane may be read out or otherwise output in a non-visual manner. "Read out," as used herein, may include, for example, converting text to speech and outputting the speech as the audio signal, playing a pre-recorded audio data of the text being read, or other forms of non-visual output of information that would be processed visually by sighted persons.

For example, if a pane has a header or title, the header or title may be read out. Each section may also have a different tone associated with it, which may be output. Over time, a user may learn to associate each different tone with its section, which may improve the speed and efficiency of navigation through the interface.

Figure 4:
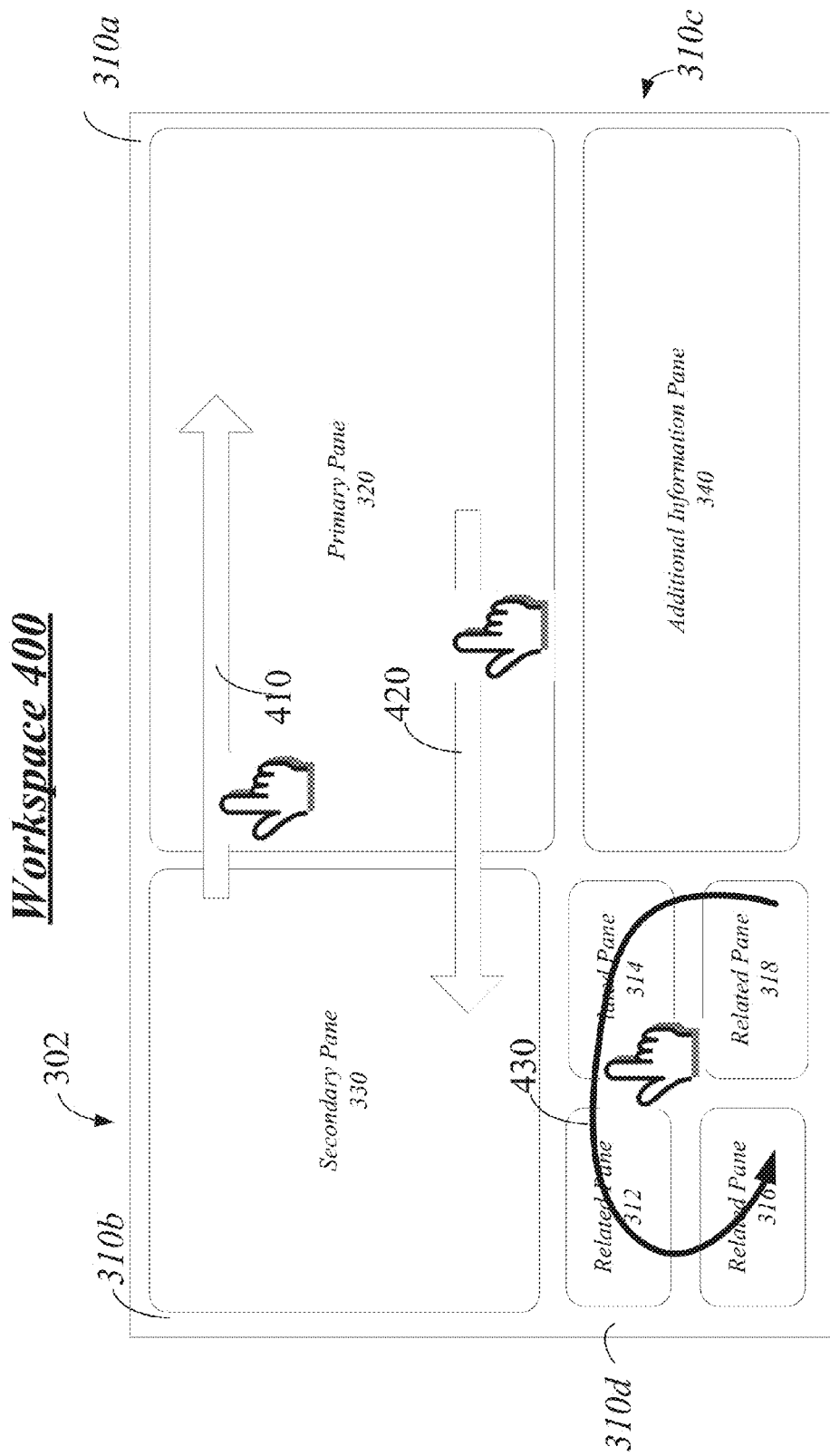
FIG. 4 illustrates another embodiment of a workspace

FIG. 4 illustrates an embodiment of a workspace 400 for the system 100. Workspace 400 is similar to workspace 300. In various embodiments, a user may be able to re-arrange the sections. Workspace 400 may reflect a change to workspace 300 where the user has swapped the positions of sections 310a and 310b, and the positions of sections 310c and 310d. Consequently, primary pane 320 has moved from the upper left position of workspace 300 to the upper right position of workspace 400; and additional information pane 340 has moved from the lower left position of workspace 300 to the lower right position of workspace 400.

In various embodiments, different combinations of touch gesture type, direction, and duration may correspond to different operations on the information displayed in workspace 400. FIG. 4 illustrates two different types of touch gesture that may be used to interact with workspace 400. One such type of touch gesture may include a slide, where the duration of the contact is longer and moves from one point to another point in substantially straight line. A slide gesture may be horizontally oriented, vertically oriented or on a diagonal. For example, FIG. 4 shows a left-to-right slide gesture, indicated by arrow 410. In various embodiments, a left-to-right slide may cause the workspace to be saved as a saved workspace 180. FIG. 4 shows a right-to-left slide gesture, indicated by arrow 420. In various embodiments, a right-to-left slide may cause a specific item, e.g. a list item, to be removed or deleted from the workspace or the pane.

Another type of touch gesture may include a "swirl," similar to a slide, but more curved in nature. FIG. 4 shows a swirl gesture, indicated by arrow 430, where the user began the gesture by touching related pane 318, moved to related pane 314 without discontinuing contact, then to related pane 312 and ended the gesture on related pane 316. During a swirl gesture, some of the information associated with each pane may be output to the user. For example, if each related pane in workspace 400 has a header or a title in the form of text, the text of the header may be read out as the swirl gesture contacts that pane. The longer the duration of contact with a pane, the more information from that pane may be output.

Other touch gestures, not illustrated, may allow a user to "open" a pane to access lower level information related to the category of data of the pane. Such touch gestures may include, without limitation, a pinching gesture made with two fingers approaching each other or separating from each other, a double-tap, a triple-tap, or a tap-and-hold gesture.

When a pane is opened, workspace 400 may be removed from display 310 and may be replaced by another user interface element, such as a list. In some embodiments, when a pane is opened, workspace 400 may be removed from display 310 and replaced by another workspace providing a next-level view of information related more specifically to the pane that was opened.

Figure 5:
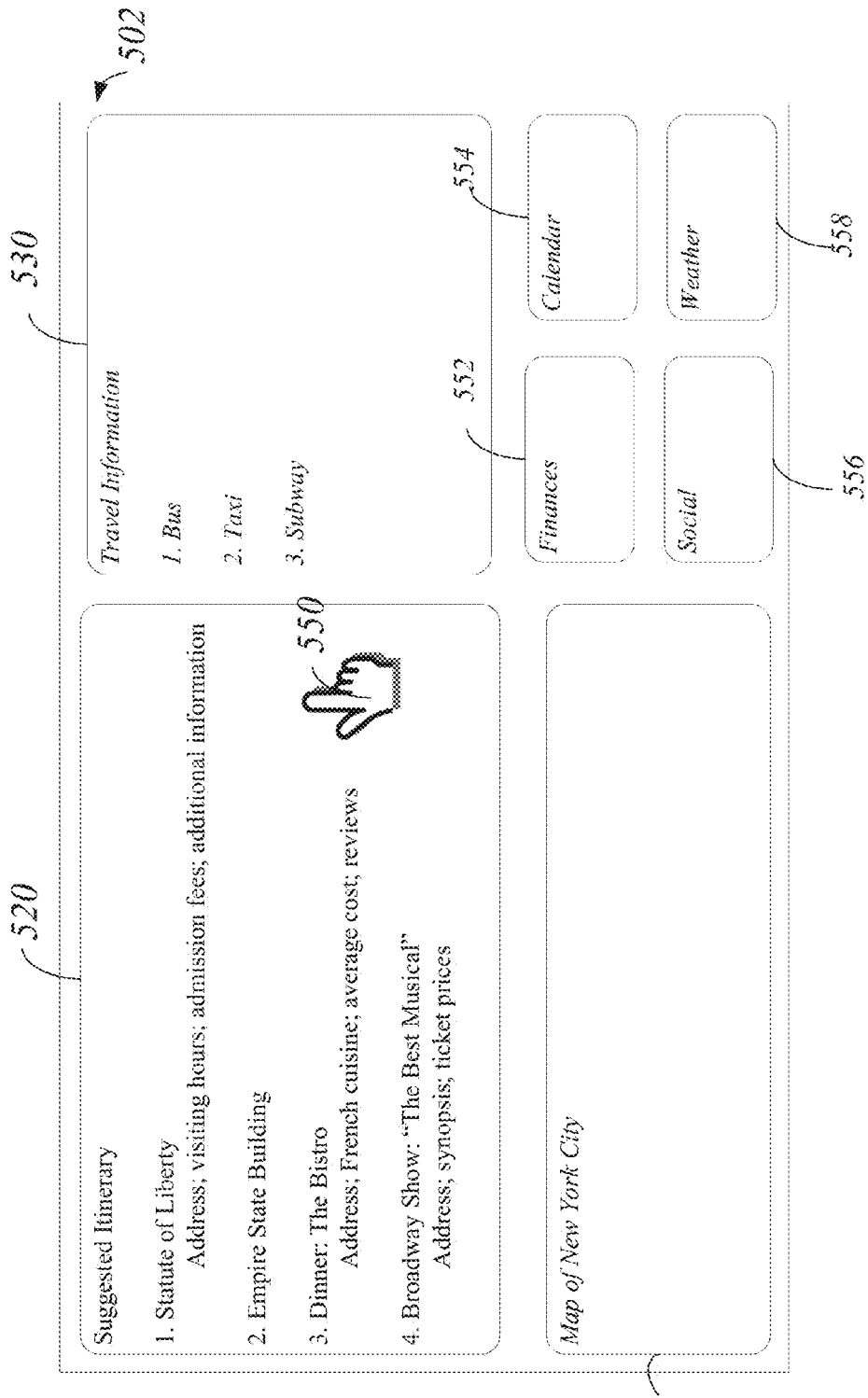
FIG. 5 illustrates an embodiment of a workspace for a search application.

FIG. 5 illustrates specific example of a workspace 500 presented on display 502 in the context of an application 170 that is a search application. For the purposes of the example, the search performed was for "things to do in New York City." Workspace 500 may include primary pane 520, secondary pane 530, additional information pane 540, and related panes 552, 554, 556, and 558. Icon 550 represents a touch gesture received from a human user.

In the context of a search application, primary pane 520 may be associated with a category such as "search results." Primary pane 520 may display, for example, a list or other collection of search results for a suggested itinerary relating to the search query "things to do in New York City." In the illustrated example, four items from the list are displayed along with the title or header of "Suggested Itinerary." When a touch gesture is received on primary pane 520, a tap gesture may cause the text "suggested itinerary" to be read out. In addition, a sound associated with primary pane 520 may be output to help the user know that she has touched primary pane 520. A double-tap, or a pinch gesture, for example, may open the pane and display more list items.

A tap touch gesture may be received on a list item, e.g. list item 1 for the Statue of Liberty. The topic or title of the list item, e.g. "Statue of Liberty" may be read to the user. A slide touch gesture may be received that traverses several list items. Each list item title, or a portion of each title, may be read as the slide touch gesture moves from list item to list item. The speed of the slide touch gesture may affect how much information is read from each list item. A slower slide touch gesture may cause additional information for a list item to be read, for example, the address and restaurant type for list item 3. If the user is not interested in a list item, the list item may be deleted, for example, with a right-to-left slide gesture over the list item. To get more information about a list item, a tap touch gesture to select the list item, followed by a second touch gesture may open a new user interface element to display information about the list item. For example, selecting to open list item 4 for the Broadway show may open a website for the theater or for a ticket vendor for the theater. Other methods of item selection and opening are possible.

Secondary pane 530 may display, in this example, travel information related to the list items in primary pane 520. Secondary pane 530 may display travel information, e.g. specific bus routes and times, available taxi services, nearby subway stops, as a list or in another format. A tap touch gesture on secondary pane 530 may cause the text "travel information" to be read out. A different sound associated with a secondary pane may be output as well.

The user may determine what is listed in secondary pane 530 by performing a slide touch gesture over the list as previously described. If, for example, the user would rather not use the subway, list item 3 for the subway information can be removed with a horizontal slide gesture, e.g. to the right.

Additional information pane 540 may, in this example, display a map of New York City. Related pane 552 may include financial information for the user, for example, links to online bank account information. Related pane 554 may include calendar information about the user's schedule, for example, imported from a calendar application. Related pane 556 may include social information, for example, social network connections of the user who live or work in New York City. Related pane 558 may include current or predicted weather information for New York City.

As the user makes changes to workspace 500, for example, by deleting list items, workspace 500 may be saved to a saved workspace 180. The user can retrieve the saved workspace later and continue interacting with the application without having to repeat any of the changes made previously.

In the context of this example, the search application may have a section map 172 that associates "search results" with primary pane 520, "logistical information" with secondary pane 530, "location information" with additional information pane 540, and various user-specific information with related panes 512-518.

A different application 170 may have a completely different section mapping. A medical records application may, for example, map patient information and history to a primary pane, treatments and medications to a secondary pane; tests and assessments to an addition information pane; and current research on the patient's conditions, treatment support and so forth to the related panes. The embodiments are not limited to these examples.

Figure 6:
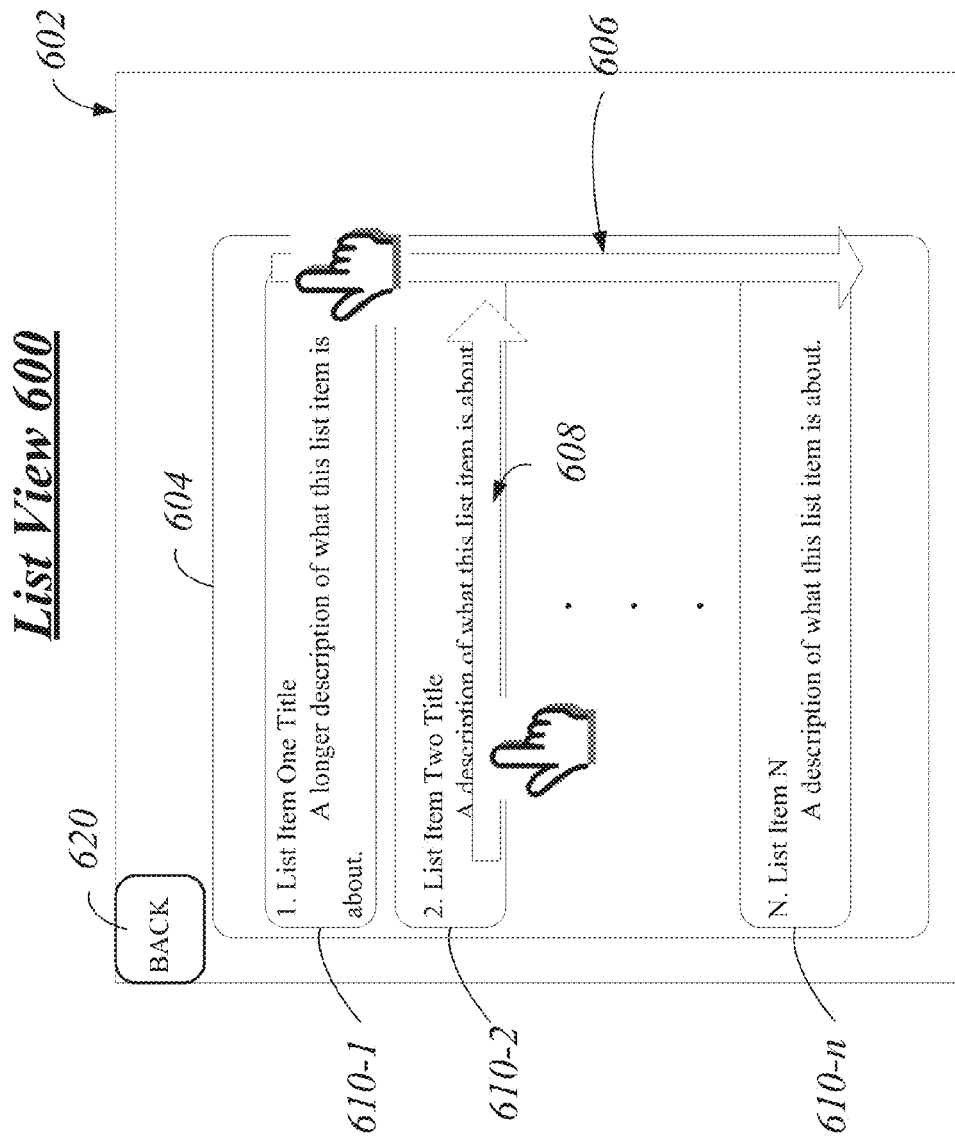
FIG. 6 illustrates an embodiment of a list view of a user interface.

FIG. 6 illustrates an embodiment of list view 600 for the system 100. As shown in FIG. 6, list view 600 may be displayed alone on a display 602 or may be displayed within a pane, e.g. in primary pane 320. List view 600 may display a list 604 having a plurality of list items 610-1, 601-2 . . . 610-n, where n denotes a positive integer. In some cases, the number of list items may exceed the space available to display them and list view 600 may only display a subset of list items 610 at any given time.

A list item 610 may include one or more elements of information. A list item 610 may, for example, have a topic, a header or a title, as well as a longer description of what the list item is about, a link to additional sources of information, images, and so forth.

A user may interact with list view 600 with various types of touch gestures. For example, a user may learn what list items 610 are displayed by a slide touch gesture, indicated by arrow 606. As the touch gesture moves from list item 610-1 to 610-2, for example, the list item titles may be read out to the user. If the touch gesture is still in contact with a list item after the title is read, then the longer description may be read, at least until the touch gesture loses contact with that list item. A user may remove an item from the list, for example, with a left-to-right slide gesture indicated by arrow 608.

List view 600 may include a back button 620. In an embodiment, receiving a touch gesture on back button 620 may cause UI logic 160 to return to a previous UI presentation, e.g. to the workspace that provided access to list view 600. In various embodiments, the placement of back button 620 may be substantially similar to the placement of back buttons in, for example, web browser or file directory browser windows. This may provide a continuity of experience across applications for the user and eliminate the need for the user to hunt for a back button.

Figure 7:
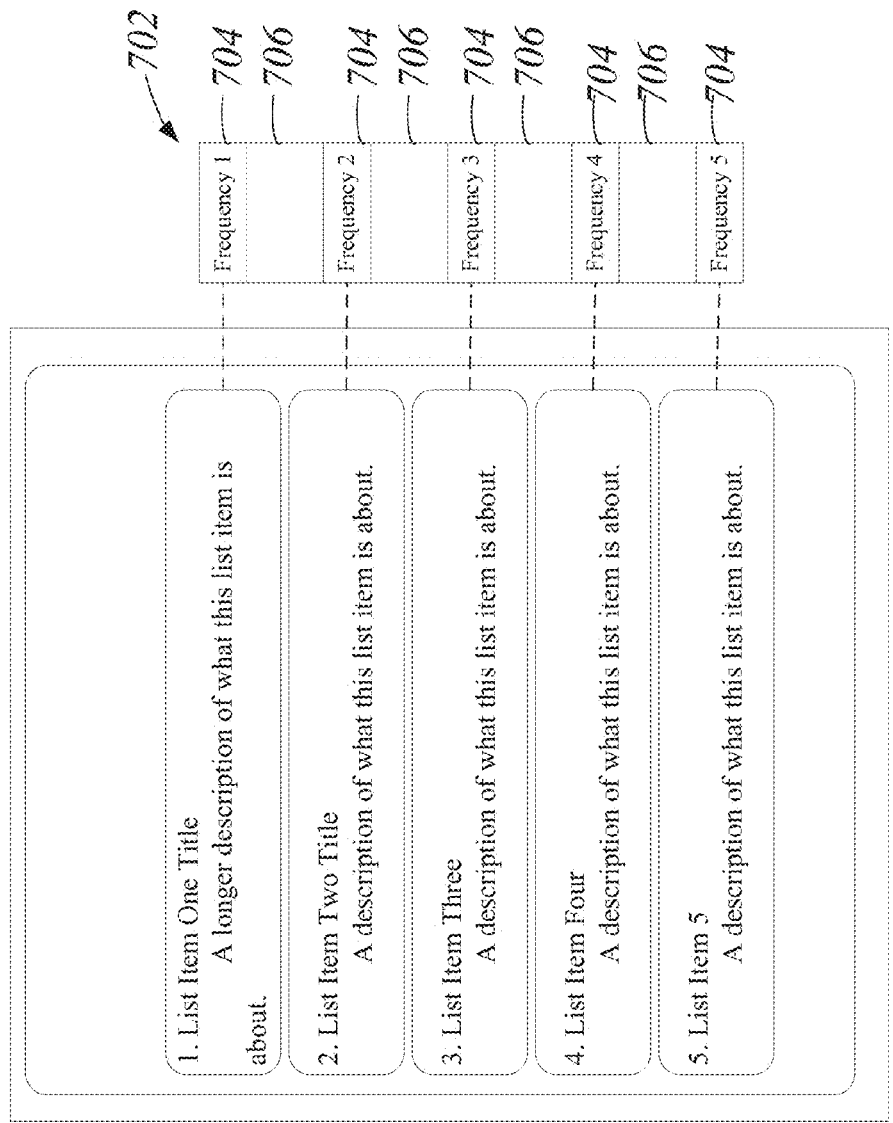
FIG. 7 illustrates another embodiment of a list view of a user interface.

FIG. 7 illustrates an embodiment of a list view 700 for the system 100. As shown in FIG. 7, list view 700 is similar to list view 600, but is limited, for descriptive purposes, to having five list items. In various embodiments, a list view, such as list views 600 and 700, may be mapped to a scale 702 of audible frequencies. As a sliding touch gesture is received, e.g. as shown by arrow 606 in FIG. 6, the frequencies may be played as audio output. The highest (or lowest) frequency may be assigned to the first list item, and the lowest (or highest) frequency may be assigned to the last list item. With this feedback, the user may quickly determine their position in the list.

In some embodiments, the highest and lowest frequencies in the scale 702 may be fixed, regardless of list length. A number of frequencies 704 may be selected from the scale 702, corresponding to the number of list items. The selected frequencies 704 are then assigned to each list item. The first list item is assigned the frequency at one end of the scale, e.g. the highest, and the last list item is assigned the frequency at the other end of the scale, e.g. the lowest. In FIG. 7, list item 1 is assigned to frequency 1, and list item 5 is assigned to frequency 5. The step 706 between two adjacent selected frequencies, e.g. the distance or separation between two frequencies, may be equal to the step between any other two selected frequencies. A list having many items will have a much smaller step 706 between frequencies 704 than a list with only a few items. This allows the experienced user to quickly determine how long the list is based just on the size of the step 706 between the selected frequencies for each list item. In various embodiments, alternatively, the size of the steps 706 between frequencies 704 may be unequal to each other.

In various embodiments, when a list item is deleted, the frequencies are not reassigned. When the frequencies are output for the list items, e.g. during a slide touch gesture, the frequency assigned to the deleted list item may not be played.

Figure 8:
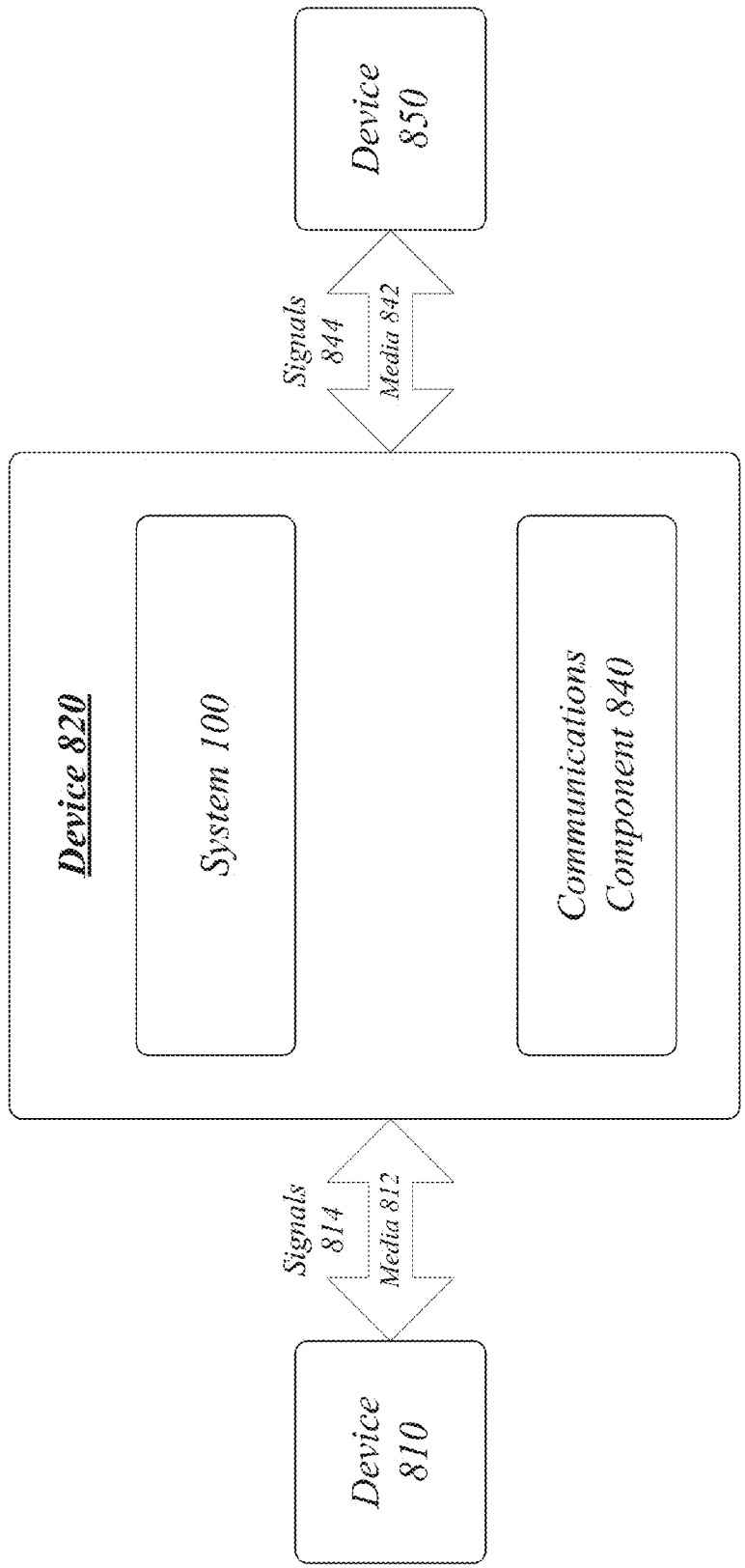
FIG. 8 illustrates an embodiment of a centralized system.

FIG. 8 illustrates a block diagram of a centralized system 800. The centralized system 800 may implement some or all of the structure and/or operations for the system 100 in a single computing entity, such as entirely within a single device 820.

The device 820 may comprise some or all of the components of electronic device 110 (not shown) and may also include a communications component 840.

The device 820 may execute communications operations or logic for the system 100 using communications component 840. The communications component 840 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 812, 842 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 820 may communicate with other devices 810, 850 over a communications media 812, 842, respectively, using communications signals 814, 844, respectively, via the communications component 840. The devices 810, 850 may be internal or external to the device 820 as desired for a given implementation. Devices 810, 850 may include, for example, devices that provide information to assist in navigation, cameras, information servers and so forth.

Figure 9:
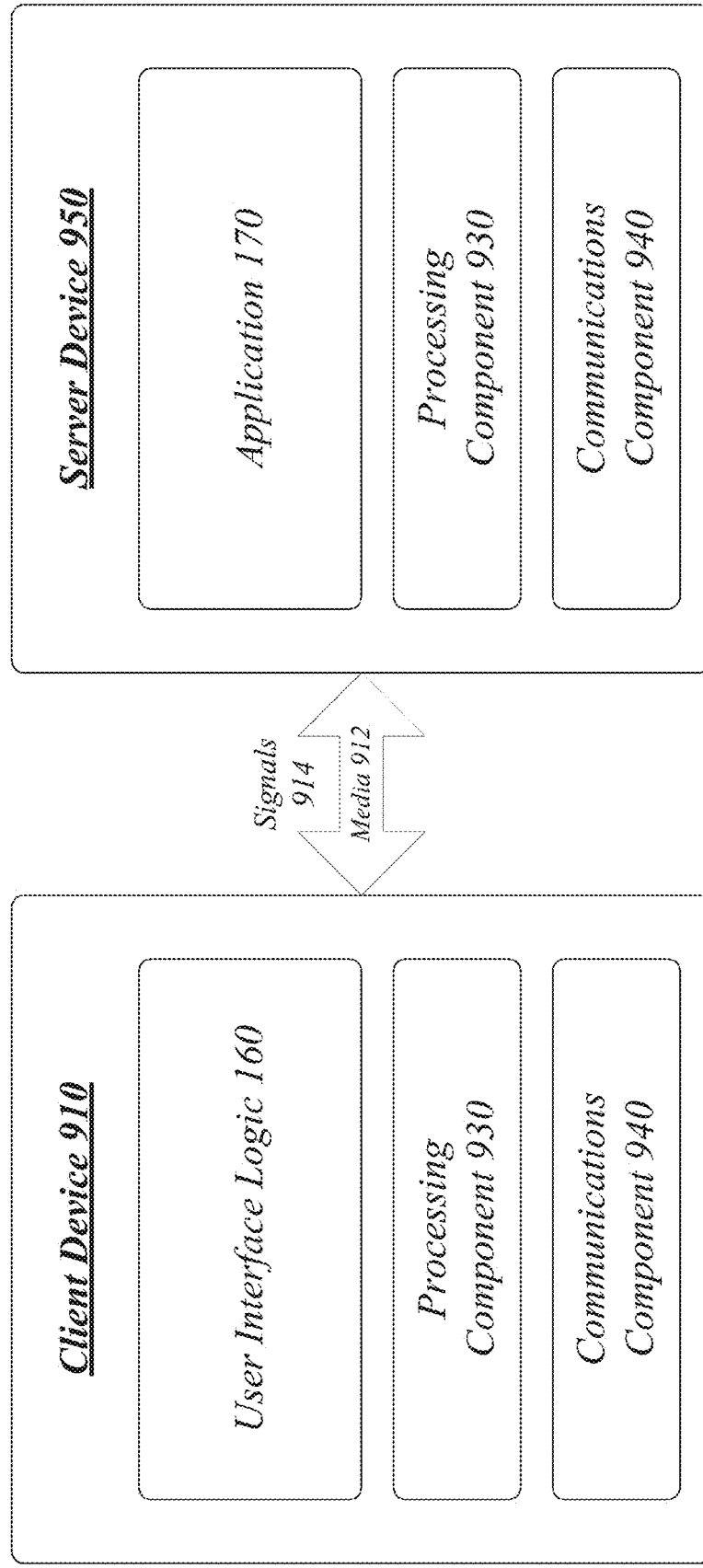
FIG. 9 illustrates an embodiment of a distributed system.

FIG. 9 illustrates a block diagram of a distributed system 900. The distributed system 900 may distribute portions of the structure and/or operations for the system 100 across multiple computing entities. Examples of distributed system 900 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 900 may comprise a client device 910 and a server device 950. In general, the client device 910 and the server device 950 may be the same or similar to the electronic device 110 and client device 820 as described with reference to FIGS. 1 and 8. For instance, the client device 910 and the server device 950 may each comprise a processing component 930 and a communications component 940 which are the same or similar to the processing component 120 and the communications component 840, respectively, as described with reference to FIGS. 1 and 8. In another example, the devices 910, 950 may communicate over a communications media 912 using communications signals 914 via the communications components 940.

The client device 910 may comprise or employ one or more client programs that operate to perform various methodologies in accordance with the described embodiments. In one embodiment, for example, the client device 910 may implement user interface logic 160.

The server device 950 may comprise or employ one or more server programs that operate to perform various methodologies in accordance with the described embodiments. In one embodiment, for example, the server device 950 may implement one or more applications 170. The client device 910 may be using a server-provided application 170, and may receive, along with data and services from application 170, a section map 172 that allows the local UI logic 160 to present the application data in a way consistent with other applications.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 10 illustrates one embodiment of a logic flow 1000. The logic flow 1000 may be representative of some or all of the operations executed by one or more embodiments described herein.

In the illustrated embodiment shown in FIG. 10, the logic flow 1000 may divide a display area into a plurality of sections at block 1002. For example, UI logic 160 may divide the display area of display 130 into two or more sections 310. The sections may be equal in size, or may be unequal in size. In various embodiments, the positions of the sections may be rearranged by a user.

The logic flow 1000 may associate each section with a category at block 1004. For example, UI logic 160 may, associate each section with a general category such as "primary", "secondary", "additional information," and "related." UI logic 160 may associate a section with a category in conjunction with a section map 172 received from an application, e.g. application 170. The general categories may be application-independent and may serve as a template for applications in generating a section map 172 for the application.

The logic flow 1000 may display a pane in each section having information about the category at block 1006. For example, UI logic 160 may display a primary pane 320 in a section 310a for a "primary" category. The information may include, for example, a title or header text, a list, an image, links to data sources, maps, additional text, data displays, and so forth. A section may be sub-divided into subsections, where each subsection behaves as a section and has its own associated category.

Figure 11:
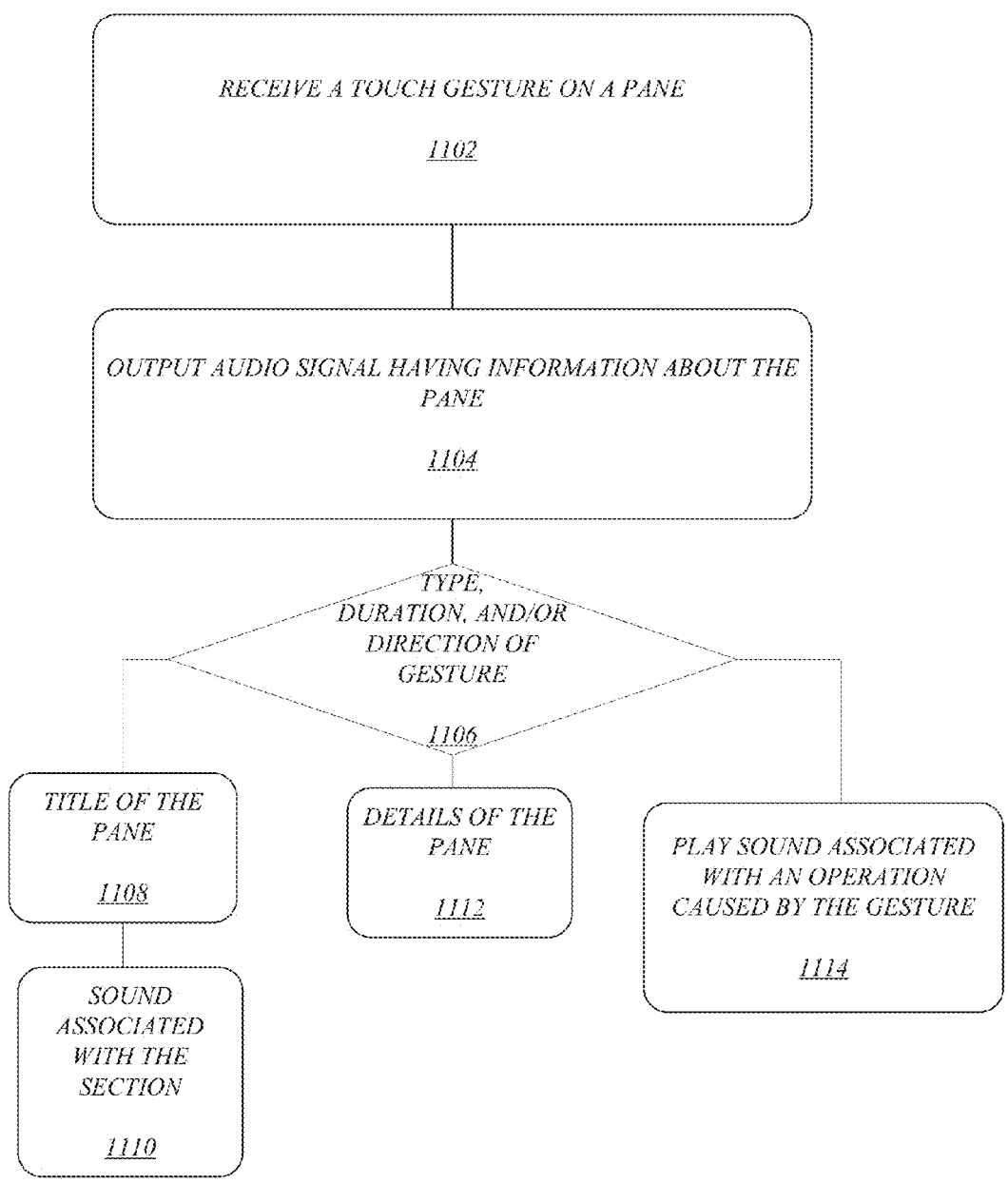
FIG. 11 illustrates a second logic flow for the system of FIG. 1.

FIG. 11 illustrates one embodiment of a logic flow 1100. The logic flow 1100 may be representative of some or all of the operations executed by one or more embodiments described herein. In particular, logic flow 1100 may represent some of the operations of workspace component 220.

In the illustrated embodiment shown in FIG. 11, the logic flow 1100 may receive a touch gesture on a pane at block 1102. The touch gesture may include a tap, a slide, a swirl, a tap-and-hold, a pinch-in, a pinch-out, and so forth. The touch gesture may include physical contact between the display and, e.g. a finger or a stylus. The touch gesture may also include a control directive received via an input device directing a pointer on the display.

The logic flow 1100 may output an audio signal having information about the pane at block 1104. The type of audio signal may depend on the type of the touch gesture, the direction of the touch gesture, and/or the duration of the touch gesture, as determined in block 1106.

For example, a tap gesture may cause the title, header, or summary information of the pane to be read out, in block 1108. For example, the title or header text may be converted using a text to speech operation and resulting speech may be output as the audio signal. Some or all of the text may be available in pre-recorded audio file(s) of the text being read, and the audio files may be output as the audio signal. The embodiments are not limited to these examples.

A tap gesture may also cause a sound associated with the section of the pane to be played, in block 1110. Each section may have a different sound associated with it, such that the user can receive instant audio feedback of which section of the display they are interacting with.

A tap-and-hold, a slide, or a swirl gesture may cause more information, e.g. details, of the pane to be read out, in block 1112. The amount of detail read out may depend on the duration of the touch gesture on that pane. A longer-lasting touch may cause more information to be read out as compared with a shorter-lasting touch.

Some touch gestures may cause audio signals to be output that are associated with an operation caused by the touch gesture rather than information about the pane, in block 1114. For example, a slide to the right may delete an item from the display, and may be accompanied by a sound associated with a delete action. A slide to the left may save a workspace, and may be accompanied by a sound associated with saving. A pinch, double-tap, or other gesture to open a pane may be accompanied by a sound associated with opening a pane.

The touch gestures described herein, and the operations associated with them, are not limited to these examples. Other touch gestures and resulting operations may be included in the embodiments.

FIG. 12 illustrates one embodiment of a logic flow 1200. The logic flow 1200 may be representative of some or all of the operations executed by one or more embodiments described herein. In particular, logic flow 1200 may represent some of the operations of list screen component 230.

In the illustrated embodiment shown in FIG. 12, the logic flow 1200 may display a list having a plurality of list items at block 1202. For example, list screen component 230 may display a list within a pane, or on all, or a portion, of display 130.

The logic flow 1200 may select a number of equally spaced frequencies from the scale, including the highest and lowest frequencies in the scale according to the number of list items at block 1204. For example, if the list has ten list items, list screen component 230 may select the highest and lowest frequencies in the scale, and eight additional frequencies within the scale. The steps, e.g. the separation or distance, between any two adjacent selected frequencies may be the same. In various embodiments, the scale may be fixed in size, regardless of list length. This may provide information to the user, from list to another, of how many items are on a list, and approximately where in the list they are. Lists with more items will have smaller steps between the selected frequencies compared to lists with fewer items.

The logic flow 1200 may assign each frequency to a list item sequentially at block 1206. For example, if the first list item is assigned the highest selected frequency, the second list item may be assigned the next selected lower frequency, and so forth, until the last list item is assigned the lowest selected frequency.

The logic flow 1200 may output the assigned frequency of a list item when a touch gesture is received on that list item at block 1208. For example, if a slide touch gesture is received that begins on one list item and proceeds sequentially through several list items, the frequencies assigned to each list item may be output.

Although various embodiments are described as suitable for use with a touch interface (e.g., a touch screen), it may be appreciated that the user interface logic 160 may be adapted for use with other types of user input and user input devices, such as voice commands, eye direction movement, device movement, physical input buttons, biometric sensors, and so forth. The embodiments are not limited in this context.

Figure 13:
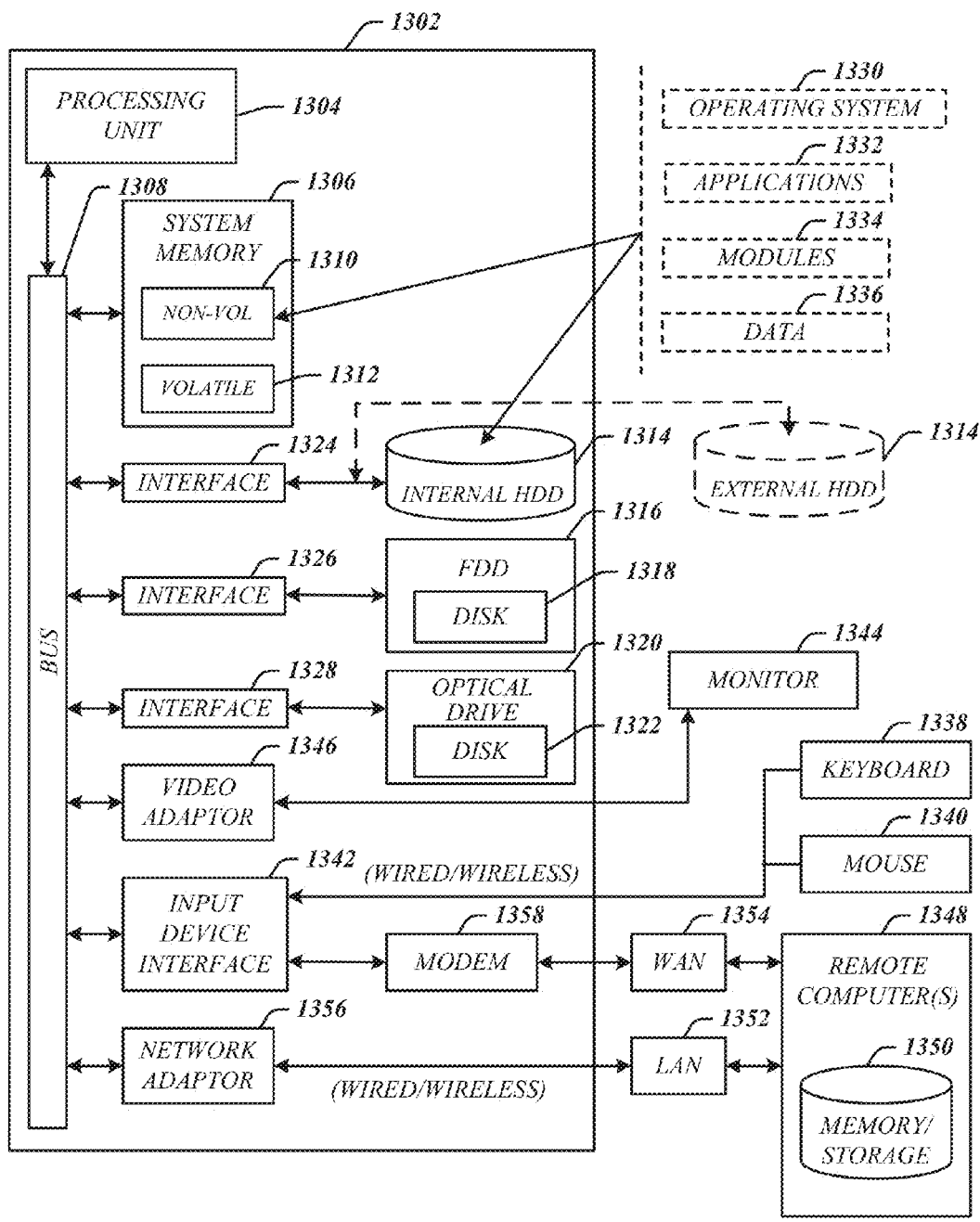
FIG. 13 illustrates an embodiment of a computing architecture.

FIG. 13 illustrates an embodiment of an exemplary computing architecture 1300 suitable for implementing various embodiments as previously described. In one embodiment, the computing architecture 1300 may comprise or be implemented as part of an electronic device. Examples of an electronic device may include those described with reference to FIGS. 1 and 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1300. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1300 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1300.

As shown in FIG. 13, the computing architecture 1300 comprises a processing unit 1304, a system memory 1306 and a system bus 1308. The processing unit 1304 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1304.

The system bus 1308 provides an interface for system components including, but not limited to, the system memory 1306 to the processing unit 1304. The system bus 1308 can be any of several types of bus structure that may further interconnect to a memory bus (with or without a memory controller), a peripheral bus, and a local bus using any of a variety of commercially available bus architectures. Interface adapters may connect to the system bus 1308 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1300 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a computer-readable medium, which may be read and executed by one or more processors to enable performance of the operations described herein.

The system memory 1306 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 13, the system memory 1306 can include non-volatile memory 1310 and/or volatile memory 1312. A basic input/output system (BIOS) can be stored in the non-volatile memory 1310.

The computer 1302 may include various types of computer-readable storage media in the form of one or more lower speed memory units, including an internal (or external) hard disk drive (HDD) 1314, a magnetic floppy disk drive (FDD) 1316 to read from or write to a removable magnetic disk 1318, and an optical disk drive 1320 to read from or write to a removable optical disk 1322 (e.g., a CD-ROM or DVD). The HDD 1314, FDD 1316 and optical disk drive 1320 can be connected to the system bus 1308 by a HDD interface 1324, an FDD interface 1326 and an optical drive interface 1328, respectively. The HDD interface 1324 for external drive implementations can include at least one or both of Universal Serial Bus (USB) and IEEE 1394 interface technologies.

The drives and associated computer-readable storage media provide volatile and/or nonvolatile storage of data, data structures, computer-executable instructions, and so forth. For example, a number of program modules can be stored in the drives and memory units 1310, 1312, including an operating system 1330, one or more application programs 1332, other program modules 1334, and program data 1336. In one embodiment, the one or more application programs 1332, other program modules 1334, and program data 1336 can include, for example, the various applications and/or components of the system 100.

A user can enter commands and information into the computer 1302 through one or more wire/wireless input devices, for example, a keyboard 1338 and a pointing device, such as a mouse 1340. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1304 through an input device interface 1342 that is coupled to the system bus 1308, but can be connected by other interfaces such as a parallel port, IEEE 1394 serial port, a game port, a USB port, an IR interface, and so forth.

A monitor 1344 or other type of display device is also connected to the system bus 1308 via an interface, such as a video adaptor 1346. The monitor 1344 may be internal or external to the computer 1302. In addition to the monitor 1344, a computer typically includes other peripheral output devices, such as speakers, printers, and so forth.

The computer 1302 may operate in a networked environment using logical connections via wire and/or wireless communications to one or more remote computers, such as a remote computer 1348. The remote computer 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wire/wireless connectivity to a local area network (LAN) 1352 and/or larger networks, for example, a wide area network (WAN) 1354. Such LAN and WAN networking environments are commonplace in offices and companies, and facilitate enterprise-wide computer networks, such as intranets, all of which may connect to a global communications network, for example, the Internet.

When used in a LAN networking environment, the computer 1302 is connected to the LAN 1352 through a wire and/or wireless communication network interface or adaptor 1356. The adaptor 1356 can facilitate wire and/or wireless communications to the LAN 1352, which may also include a wireless access point disposed thereon for communicating with the wireless functionality of the adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wire and/or wireless device, connects to the system bus 1308 via the input device interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 14:
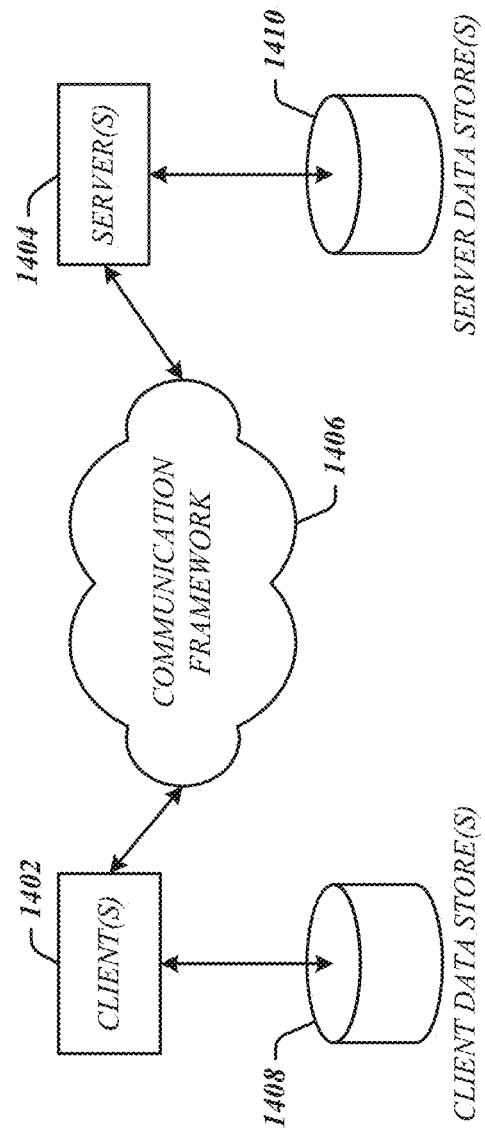
FIG. 14 illustrates an embodiment of a communications architecture.

FIG. 14 illustrates a block diagram of an exemplary communications architecture 1400 suitable for implementing various embodiments as previously described. The communications architecture 1400 includes various common communications elements, such as a transmitter, receiver, transceiver, radio, network interface, baseband processor, antenna, amplifiers, filters, power supplies, and so forth. The embodiments, however, are not limited to implementation by the communications architecture 1300.

As shown in FIG. 14, the communications architecture 1400 comprises includes one or more clients 1402 and servers 1404. The clients 1402 may implement the client device 910. The servers 1404 may implement the server device 950. The clients 1402 and the servers 1404 are operatively connected to one or more respective client data stores 1408 and server data stores 1410 that can be employed to store information local to the respective clients 1402 and servers 1404, such as cookies and/or associated contextual information.

The clients 1402 and the servers 1404 may communicate information between each other using a communication framework 1406. The communications framework 1406 may implement any well-known communications techniques and protocols. The communications framework 1406 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1406 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount of speed and capacity, distributed network controller architectures may similarly be employed to pool, load balance, and otherwise increase the communicative bandwidth required by clients 1402 and the servers 1404. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising: a processor; and user interface (UI) logic comprising a workspace component operative on the processor to:
   divide a display area of the apparatus into a workspace comprising a plurality of sections;
   divide at least one section into a plurality of subsections;
   map an audible scale of frequencies to the plurality of subsections;
   associate each section and subsection with a different category;
   display a pane in a section having information for the associated category;
   receive a touch gesture on a pane; and
   output an audio signal having an audible tone mapped to the subsection of the section of the pane, the audible tone being followed by speech data to read out information about the mapped subsection of the section of the pane, an amount of the information corresponding to at least two of the touch gesture type, duration, or direction.

2. The apparatus of claim 1, the UI logic comprising a list screen component operative to:
   present a list of a plurality of list items on the display area;
   receive a touch gesture beginning on a first list item and continuing to a second list item at a first speed; and
   output a second audio signal comprising speech data about the topic of the first list item while the touch gesture is in contact with the first list item, followed by speech data about the topic of the second list item when the touch gesture is in contact with the second list item.

3. The apparatus of claim 2, the list screen component operative to:
   select a number of frequencies from the audible scale having a lowest frequency and a highest frequency, according to a number of list items in the list;
   assign a first selected frequency to the first list item, and a next selected frequency to a next list item; and
   output an assigned frequency for a list item when a touch gesture is received on that list item.

4. The apparatus of claim 2, wherein a duration of the touch gesture determines an amount of information output in the speech data.

5. The apparatus of claim 1, wherein the audio signal comprises at least one of:
   a text to speech output of the information; and
   a tone associated with at least one of a type of the touch gesture and the pane receiving the touch gesture.

6. The apparatus of claim 1, the UI logic operative to:
   receive a command directive to re-position a section to a different location on the display area; and
   move the section to the different location.

7. The apparatus of claim 1, the UI logic operative to:
   use a section map from an application to associate each section and subsection with a category.

8. The apparatus of claim 7, the UI logic operative to:
   display information from the application in the panes.

9. A computer-implemented method, comprising:
dividing a display area of an electronic device into a workspace comprising a plurality of application independent sections;
associating each section with a different application dependent category and a different tone;
displaying a pane in a section including information for the associated category;
receiving a touch gesture on the pane for the section; and
outputting an audio signal comprising information of the pane and according to a tone of the section, the audio signal having an audible tone followed by speech data to read out information about the section of the pane, an amount of the information corresponding to at least two of the touch gesture type, duration, or direction.

10. The computer-implemented method of claim 9, comprising:
dividing at least one section into a plurality of subsections;
associating each subsection with a different category; and
displaying a pane in each subsection.

11. The computer-implemented method of claim 9, comprising:
presenting a list of a plurality of list items on the display area;
receiving a touch gesture beginning on a first list item and continuing to a next list item at a first speed;
outputting a second audio signal comprising speech data about a title of the list item while the touch gesture is in contact with the first list item, followed by speech data about the topic of the next list item when the touch gesture is in contact with the next list item.

12. The computer-implemented method of claim 11, comprising:
selecting a number of frequencies from an audible scale having a lowest frequency and a highest frequency, according to a number of list items in the list;
assigning a first selected frequency to the first list item, and a next selected frequency to a next list item; and
outputting an assigned frequency for a list item when a touch gesture is received on that list item.

13. The computer-implemented method of claim 11, comprising:
deleting a list item from the list in response to a first slide gesture; and
saving the workspace in response to a second slide gesture having a direction different from a direction of the first slide gesture.

14. The computer-implemented method of claim 9, comprising:
determining an amount of information to output in the audio signal according to a duration of the touch gesture.

15. The computer-implemented method of claim 9, wherein outputting the audio signal comprises outputting at least one of:
a text to speech output of the information; and
a tone associated with at least one of a type of the touch gesture and the pane receiving the touch gesture.

16. At least one computer-readable storage memory unit comprising instructions that, when executed, cause a system to:
divide a display area of an electronic device into a workspace comprising a plurality of sections that are application independent;
divide at least one section into a plurality of subsections;
associate each section and subsection with a different category that is application dependent;
display a pane in a section having a plurality of items for the associated category;
associate a different sound to each item of the plurality of items;
receive a touch gesture on the section in the pane; and
output an audio signal comprising at least one sound associated with an item of the plurality of items, the at least one sound being followed by speech data to read out information about the item, an amount of the information corresponding to at least two of the touch gesture type, duration, or direction.

17. The computer-readable storage medium of claim 16, comprising instructions that when executed cause the system to:
present a list of a plurality of list items on the display area;
receive a touch gesture beginning on a first list item and continuing to a second list item at a first speed;
output a second audio signal comprising speech data about the topic of the first list item while the touch gesture is in contact with the first list item, followed by speech data about the topic of the second list item when the touch gesture is in contact with the second list item.

18. The computer-readable storage medium of claim 17, comprising instructions that when executed cause the system to:
select a number of frequencies from an audible scale having a lowest frequency and a highest frequency, according to a number of list items in the list;
assign a first selected frequency to the first list item, and a next selected frequency to a next list item; and
output an assigned frequency for a list item when a touch gesture is received on that list item.

19. The computer-readable storage medium of claim 16, comprising instructions that when executed cause the system to:
receive second touch gesture on a pane; and
open at least one of a list and a second workspace in place of the workspace.

20. The computer-readable storage medium of claim 16, wherein the instructions for outputting the audio signal comprise instructions that when executed cause the system to output at least one of:
a text to speech output of the information; and
a tone associated with at least one of a type of the touch gesture and the pane receiving the touch gesture.

* * * * *